United States Patent
Gopalan et al.

(10) Patent No.: US 11,034,342 B2
(45) Date of Patent: Jun. 15, 2021

(54) VACUUM GENERATOR/AMPLIFIER FOR GAS APPLICATIONS AND BRAKE BOOSTER GENERATION METHOD

(71) Applicant: DLHBOWLES, INC., Canton, OH (US)

(72) Inventors: Shridhar Gopalan, Westminster, MD (US); Corey Zamenski, Essex, MD (US)

(73) Assignee: DLHBOWLES, INC., Canton, OH (US)

( * ) Notice: Subject to any disclaimer, the term of this patent is extended or adjusted under 35 U.S.C. 154(b) by 15 days.

(21) Appl. No.: 16/484,872

(22) PCT Filed: Feb. 21, 2018

(86) PCT No.: PCT/US2018/018966
§ 371 (c)(1),
(2) Date: Aug. 9, 2019

(87) PCT Pub. No.: WO2018/156590
PCT Pub. Date: Aug. 30, 2018

(65) Prior Publication Data
US 2019/0381986 A1    Dec. 19, 2019

Related U.S. Application Data

(60) Provisional application No. 62/461,633, filed on Feb. 21, 2017.

(51) Int. Cl.
*B60T 17/04* (2006.01)
*B60T 13/52* (2006.01)
(Continued)

(52) U.S. Cl.
CPC .............. *B60T 17/04* (2013.01); *B60T 13/52* (2013.01); *F02M 35/10229* (2013.01);
(Continued)

(58) Field of Classification Search
CPC .... B60T 17/04; B60T 13/52; F02M 35/10229
See application file for complete search history.

(56) References Cited

U.S. PATENT DOCUMENTS

| 4,211,200 A | 7/1980 | Rocchio et al. |
| 5,291,916 A | 3/1994 | Kloosterman et al. |

(Continued)

FOREIGN PATENT DOCUMENTS

KR    20160375548    8/2016

OTHER PUBLICATIONS

Patent Cooperation Treaty (PCT), International Search Report and Written Opinion for Application PCT/US2018/018966 filed Feb. 21, 2018, dated May 8, 2018, International Searching Authority, US.

*Primary Examiner* — Kevin R Barss
(74) *Attorney, Agent, or Firm* — McDonald Hopkins LLC

(57) ABSTRACT

A vacuum generator/amplifier system for gas applications and a brake booster generation method uses a vacuum amplifier system including a multi-lumen defining member comprising a modified venturi geometry having a converging section leading to a throat (lumen segment of minimum ID diameter), followed by a straight section culminating in to a diverging section and a port for output vacuum which is located after the throat at the beginning of the straight section. The converging section has a sinusoidal shape leading to the point of convergence, also called the throat, with a minimum internal lumen diameter D, and generates an amplified vacuum at the output with a gain ratio of four to one, with substantially reduced parasitic losses, even at low flows.

20 Claims, 12 Drawing Sheets

(51) Int. Cl.
  *F02M 35/10* (2006.01)
  *B01F 3/02* (2006.01)
  *B01F 5/04* (2006.01)

(52) U.S. Cl.
  CPC ............... *B01F 3/02* (2013.01); *B01F 5/0428* (2013.01); *B01F 2005/0441* (2013.01)

(56) References Cited

U.S. PATENT DOCUMENTS

| | | |
|---|---|---|
| 2006/0016477 A1 | 1/2006 | Zaparackas |
| 2011/0186151 A1 | 8/2011 | Sparazynski |
| 2013/0213510 A1 | 8/2013 | Burnham |
| 2013/0233287 A1 | 9/2013 | Leone |
| 2014/0014080 A1 | 1/2014 | Beshay et al. |
| 2015/0204452 A1 | 7/2015 | Flethcer et al. |
| 2015/0233393 A1 | 8/2015 | Burnham et al. |
| 2016/0053727 A1 | 2/2016 | Miller et al. |
| 2016/0153472 A1 | 6/2016 | Fletcher et al. |
| 2016/0375548 A1 | 12/2016 | Fletcher et al. |

VACUUM GENERATOR/AMPLIFIER FOR GAS APPLICATIONS AND BRAKE BOOSTER GENERATION METHOD

CROSS-REFERENCE TO RELATED APPLICATIONS

This application is a 35 U.S.C. 371 national stage filing of International Application No. PCT/US2018/018966 entitled "VACUUM GENERATOR/AMPLIFIER FOR GAS APPLICATIONS AND BRAKE BOOSTER GENERATION METHOD," filed on Feb. 21, 2018, which claims priority to Provisional Patent Application No. 62/461,633 entitled "VACUUM GENERATOR/AMPLIFIER FOR GAS APPLICATIONS AND BRAKE BOOSTER GENERATION METHOD" filed on Feb. 21, 2017 and are hereby incorporated by reference in their entirety.

FIELD OF INVENTION

The present invention relates to automotive brake boosters and related control input transmission systems for transmitting or amplifying an output vacuum in response to sensing an input vacuum, and more generally to gas entrainment and mixing devices and methods.

BACKGROUND

In automotive applications, vacuum assisted brake boosters are typically connected to an engine's intake manifold while an output connected to a vacuum reservoir of the brake booster. The brake booster system's output is therefore partly a function of the vacuum level and. flows generated in the engine's intake manifold. Older, larger displacement engines pumped significantly more air through their intake manifolds than today's smaller, more fuel efficient engines. Prior art brake booster systems typically used multi-port structures such as that shown in U.S. Pat. No. 5,291,916 (and RE37090) to Klosterman, et al., which includes one or more elastomeric check valves of the type seen in U.S. Pat. No. 3889,710 to Brost.

As a result, the prior art vacuum systems are becoming less effective, because these smaller engines generate smaller vacuum levels in their intake manifolds, and thus offer the brake booster system less to work with, so the vacuum assist is reduced because of the low intake manifold vacuum levels. As a result, certain older models of automotive brake boosters are becoming obsolete due to the fact that modern engines are creating less vacuum. Also, the low flow rates create other problems such as parasitic flow losses.

There is a need, therefore, for a more effective system and method for generating an amplified vacuum boost signal which overcomes the disadvantages of the prior art.

SUMMARY

The present disclosure describes an aspirator assembly comprising a multi-lumen defining amplifier member defining a fluid passage. The amplifier member includes a converging section leading to a throat, said converging section has a sinusoidal cross-sectional shape leading to said throat. A step portion located adjacent said throat. A straight section located adjacent to said step portion. A diverging section located adjacent to said straight section. An output vacuum port extending from a sidewall of said multi-lumen defining amplifier member for providing output vacuum, said output vacuum port being located after the throat and at the beginning of the straight section.

The throat may include a minimum internal lumen diameter or dimension D. The step may be introduced immediately after the throat. The step may include an internal lumen diameter in the range of 1.1 D to 1.5 D. The fluid passage may be aligned along a central flow axis and the sinusoidal cross-sectional shape of said converging section may extend a length in the range of about 1 D to about 4 D along said central flow axis. The straight section may extend a length in the range of about 3 D to about 8 D along said central flow axis. The straight section may define an inner wall shaped in the form of a cylinder. The diverging section may define an inner wall shaped with a tapered angle relative to said straight section wherein said tapered angle is in the range of about 3' to about 8'. The diverging section may extend a length in the range of about 12 D to about 15 D along said central flow axis. The output vacuum port may extend generally normal from the longitudinal axis and includes a bore section and a tapered section wherein the bore section directly communicates with the straight section. The sinusoidal shape may be particularly effective in converting pressure energy to kinetic energy and minimizing friction losses by using a short converging length of 1 D-4 D. The step may define a transversely projecting annular wall segment having a radial extent or diameter of 1.1 D to 1.5 D, in order to generate higher amplification or gain ratios, arid wherein the throat, which terminates distally in the step, defines the beginning of the straight section.

In another embodiment, provided is an aspirator system comprising a multi-lumen defining amplifier member in communication with a multi-port housing configured for connection through tube sections to a vacuum reservoir. The multi-lumen defining amplifier member may define a fluid passage comprising a converging section leading to a throat, said converging section may have a sinusoidal cross-sectional shape leading to said throat. A step portion located adjacent said throat. A straight section located adjacent to said step portion. A diverging section located adjacent to said straight section. A output vacuum port extending from a sidewall of said multi-lumen defining amplifier member for providing amplified output vacuum, said output vacuum port being located after the throat wherein amplified vacuum pressure may be communicated via the output vacuum port to at least one check valve assembly to a tubular member of the multi-port housing.

The tubular member may include an open continuous lumen terminating at opposing ends. The opposing ends may include barb connectors adapted for connection to a vacuum tube. The straight section may include a proximal end adjacent the throat and a distal end adjacent the divergent section, wherein said output vacuum port may be positioned adjacent the proximal end of said straight section.

In another embodiment, provided is an aspirator assembly comprising a multi-lumen defining amplifier member defining a fluid passage along a central flow axis that includes a converging section leading to a throat. The throat includes a minimum internal lumen dimension D. A step portion may be located adjacent said throat. A straight section may be located adjacent to said step portion, said straight section may include a proximal end adjacent the throat and an opposite distal end. A diverging section may be located adjacent to said distal end of said straight section. An output vacuum port may extend from a sidewall of said multi-lumen defining amplifier member for providing output vacuum, said output vacuum port being located after the throat. The output vacuum port may be positioned adjacent the proximal end of said straight section. The converging section may include a sinusoidal cross-sectional shape wherein said sinusoidal cross sectional shape of said converging section extends a length in the range of about 1 D to about 4 D along said central flow axis. The step portion may define a transversely projecting annular wall segment having a radial diameter of 1.1 D to 1.5 D, in order to generate higher amplification or gain ratios, arid wherein the throat, which terminates distally in the step, defines the beginning of the straight section.

BRIEF DESCRIPTION OF THE DRAWINGS

Operation of the present disclosure may be better understood by reference to the detailed description taken in connection with the following illustrations. These appended drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the present disclosure as if fully rewritten herein. In the drawings.

DETAILED DESCRIPTION

Figure 1A:
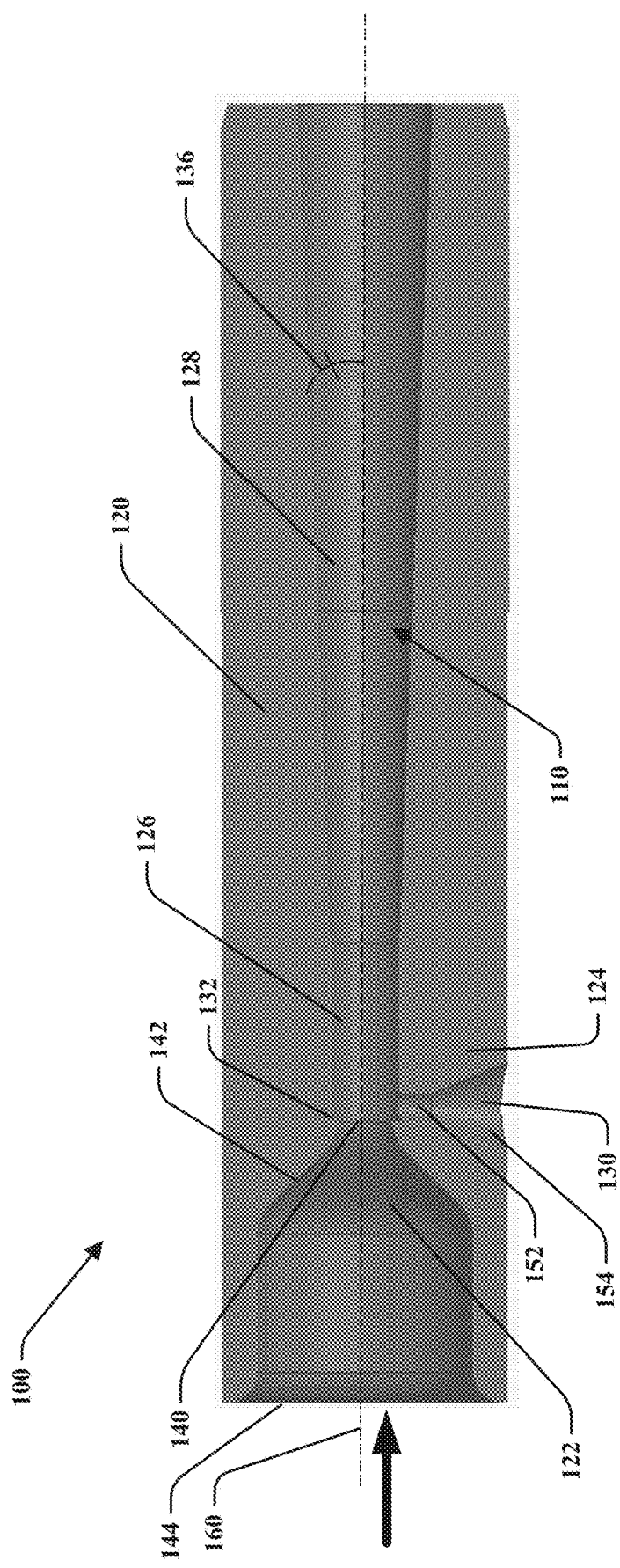
FIG. 1A is a diagrammatic cross-sectional view of an embodiment of a vacuum generator in accordance with the present disclosure.

Reference will now be made in detail to exemplary embodiments of the present disclosure, examples of which are illustrated in the accompanying drawings. It is to be understood that other embodiments may be utilized and structural and functional changes may be made without departing from the respective scope of the present disclosure. Moreover, features of the various embodiments may be combined or altered without departing from the scope of the present disclosure. As such, the following description is presented by way of illustration only and should not limit in any way the various alternatives and modifications that may be made to the illustrated embodiments and still be within the spirit and scope of the present disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Similar reference numerals are used throughout the figures. Therefore, in certain views, only selected elements are indicated even though the features of the assembly are identical in all of the figures. In the same manner, while a particular aspect of the invention is illustrated in these figures, other aspects and arrangements are possible, as will be explained below.

Provided is a vacuum amplifier system and method which is disclosed in the provided Figures. Turning now to a detailed description of vacuum generator assembly of the present invention, FIGS. 1 and 9-11 illustrate specific, illustrative embodiments of the vacuum generator assembly. FIG. 2 illustrates a prior art version of a venturi assembly. FIGS. 3-8 illustrate comparative results in graph form of the output and flow rate between the vacuum generator assembly of the instant application and the conventional venturi assembly of FIG. 2.

Vacuum amplifier assemblies may be used in an internal combustion engine in the air flow line between the engine block and the air intake port, such as a carburetor or fuel injection port. The air flow system in a typical internal combustion engine operates on the principle that a partial vacuum is created which pulls air through the air intake port of the carburetor or fuel injector to aid in proper fuel combustion. The vacuum effect has been found to be useful in supplementing vacuum assist subsystems in the vehicle, particularly, brakes, automatic transmissions and air conditioners. The addition of check valves provides the connection between a venturi pipe airway and the subsystem it serves to inhibit back pressure from the subsystem from disturbing airflow therein.

Figure 2:
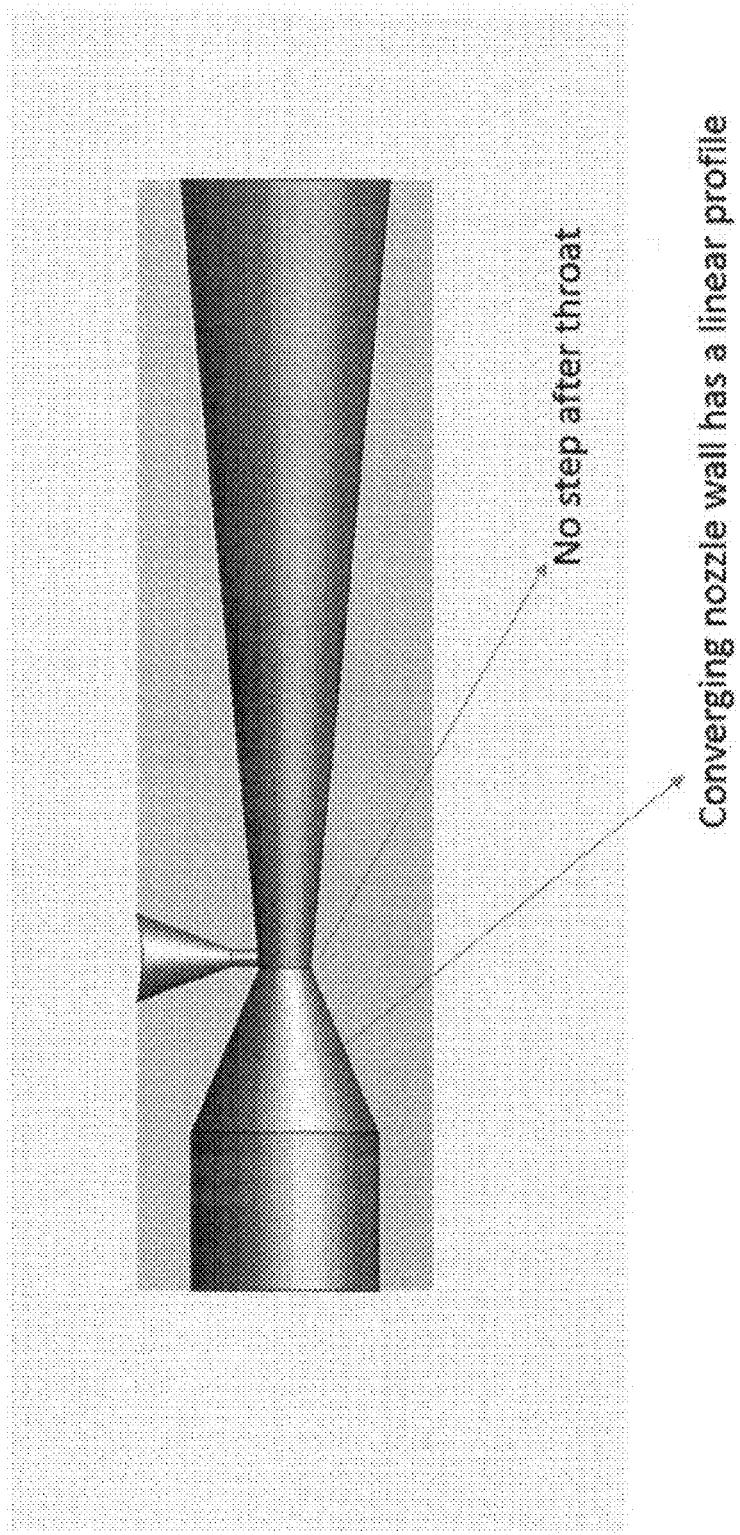
FIG. 2 illustrates a cross-sectional view of a diagram of a conventional venturi geometry as might be used in the prior art brake booster multi-port assembly such as described in U.S. Pat. No. 5,291,916 (and RE37090) to Klosterman, et al.

An aspirator assembly or vacuum amplifier assembly 100 and method of the present invention includes a modified venturi geometry which is defined within a multi-lumen defining amplifier member 120 as illustrated by FIG. 1A. The multi-lumen defining amplifier member 120 may be made of molded plastic or polymer or other rigid material that defines a fluid passage 110 therein. The amplifier member 120 includes a modified venturi geometry defined by a converging section 122 leading to a throat 140 (lumen segment of minimum ID dimension "D"), followed by a straight section 126 culminating into a diverging section 128. An output vacuum port 130 for communicating vacuum pressure which may be located after the throat 140 at the beginning of the straight section 126. The exemplary embodiment illustrated here has a converging portion or section 122 which is in fluid communication with and leads to a throat 140 (lumen segment of minimum ID dimension "D"), followed by the straight section 126 culminating in to a diverging section 128. The port 130 for the "output vacuum" is defined through a sidewall segment 124 located after the throat 140 and adjacent the proximal end of the straight section 126. The converging section 122 includes an annular sinusoidal wall 142 with a sinusoidal convergence shape leading to the minimum ID of the fluid passage 110 or throat 140. The sinusoidal wall 142 includes a curved slope shape and is different from a tapered or straight slope shape used in conventional venturi pipes.

The embodiments described herein (FIGS. 1A, 1B, and 9-11) generate a surprising vacuum amplification or gain ratios of about 4:1. Further, the identified geometric features have been identified to provide an optimized level of output vacuum at the port 130 at a reduced inlet flow rate which reduces power loss of the engine. These results may be attributed to the geometric features of the fluid passage geometry defined within the multi-lumen defining amplifier member 120.

In particular, the geometry of the fluid passage 110 may include a sinusoidal converging wall 142, a step 132, and a straight section 126 that are positioned between an inlet 144 downstream of the converging section 122 and the diverging section 128 of the vacuum amplifier system 100. Notably, FIG. 2 illustrates a prior art embodiment of a conventional venturi geometry for a brake booster in which it lacks this combination of features.

The sinusoidal shape of the wall of the converging section 122 may be generally annularly shaped to define a cavity that converges at the throat 140. The sinusoidal converging shape may have a length (along the central flow axis 160) that is relative to the diameter of the throat 140 wherein the sinusoidal converging wall includes a length that is about 1 D to about 4 D. With the shape of the converging wall 142 being sinusoidal rather than linear, it was found to be more effective when converting pressure energy to kinetic energy while also minimizing friction losses because of the short converging segment's axial length of 1 D-4 D. During prototype development work, it was found that the sinusoidal shape of the converging section 122 was effective to convert pressure energy to kinetic energy and minimize friction losses of fluid flow therein. These friction losses were present when the converging section includes an annular sinusoidal wall 142 with a short length along a central flow axis 160. In one embodiment, the sinusoidal wall 142 includes an axial length of between about 1 D to about 4 D.

Figure 1B:
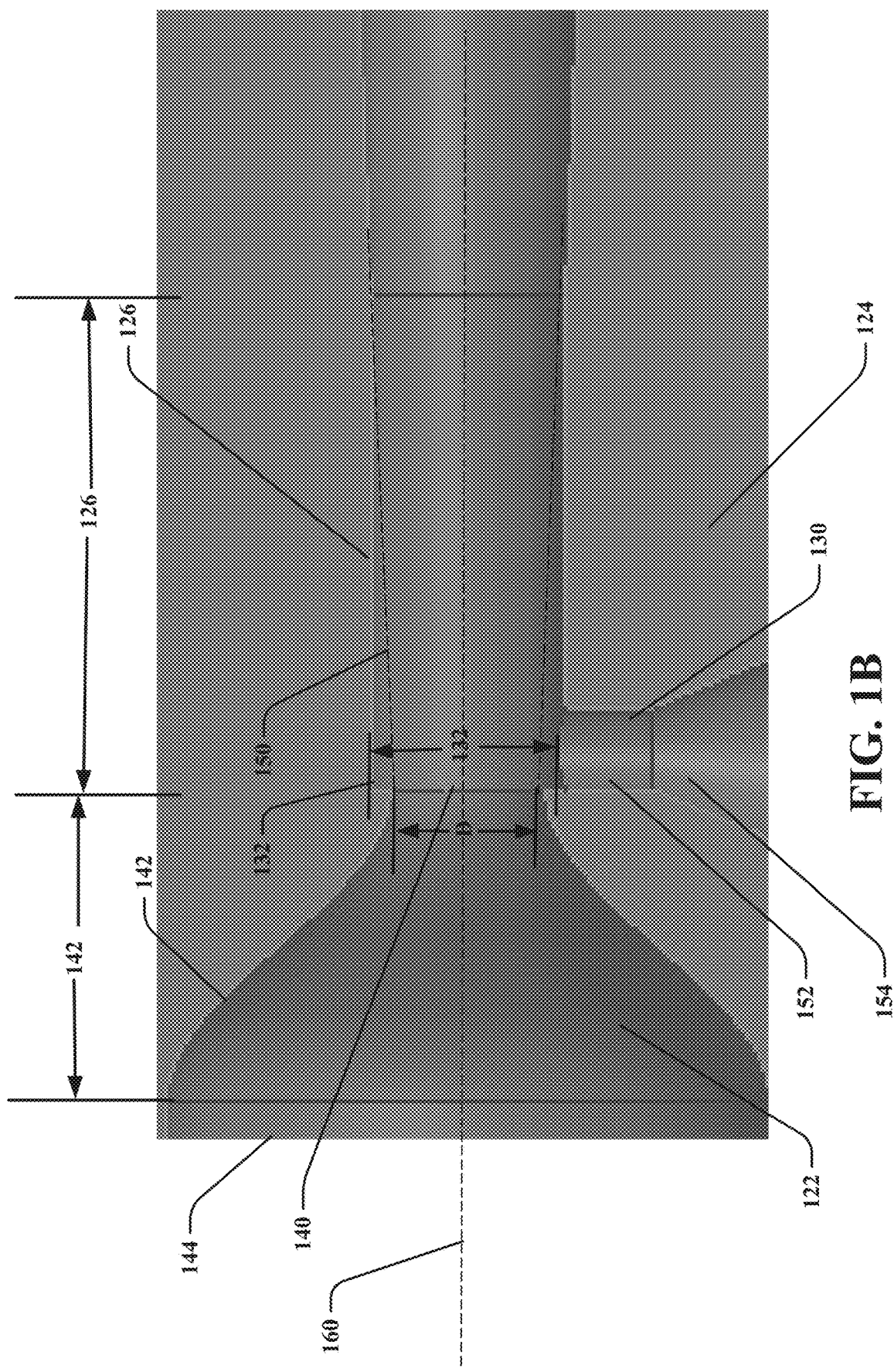
FIG. 1B is a diagrammatic cross-sectional view of an embodiment of a vacuum generator in accordance with the present disclosure.

The step 132 may be positioned directly upstream of the throat 140 to form a sudden enlarged cavity within the fluid passage 110. The step 132 may define an annular wall segment having a slightly larger dimension than the throat 140. The step 132 may include an annular cylindrical shape having a diameter that is introduced immediately after the throat as shown in FIGS. 1A and 1B. In particular, the step 132 may have a diameter that is between about 1.1 D to about 1.5 D as this range may be relative to the dimension of the throat 140. The relative size of the step 132 provides an annular discontinuity within the fluid passage 110 that has been identified to generate higher vacuum amplification than conventional venturi pipes without having a step or annular discontinuity. The vacuum amplification was identified to peak in prototypes having an annular discontinuity in the above range and declining for embodiments with larger step diameters.

As fluid (e.g. liquid or air or a mixture of both) enters the inlet 144 along the central flow axis 160, it smoothly transitions to the throat 140 along the sinusoidal shaped converging walls 142. The fluid passes through throat 140 having an inner dimension D in the reduced density. The fluid then enters into the step section 132 and expands along a trajectory or expansion angle (see dashed line 150 in FIG. 1B) until it abuts against inner walls of the straight section 126. The desired trajectory may be caused by the step 132 or annular discontinuity along the fluid passage 110 wherein the step 132 has a slightly larger dimension than the throat 140. The flow of fluid is then desired to traverse through the straight section 126 to produce the desired vacuum output produced through the port 130. The output vacuum port 130 may extends generally normal from the central flow axis and includes a bore section 152 and a tapered section 154 wherein the bore section directly communicates with the straight section 126. In one embodiment, the bore section 152 may have a dimension that is generally smaller than the throat 140.

The step 132 then defines or leads distally into the straight section 126. The straight section 126 may include cylindrical shape and extend along the central flow axis 160 of the fluid passage 110. The straight section may include a proximal end adjacent the throat 140 and an opposite distal end adjacent the diverging section 128. The straight section 126 may include a length in the range of about 3 D-8 D along the central flow axis 160 wherein the length may be related to the dimension of the throat 140 but also depend on the dimension of the step 132. The straight section 126 is followed by the diverging section 128.

The diverging section 128 may define an inner wall shaped with a tapered angle 136 relative to the straight section 126 wherein said tapered angle is in the range of about 3' to about 8' relative to the central flow axis 160. The diverging section 128 may extend a length in the range of about 12 D to about 15 D along said central flow axis 160.

By comparison, conversely, a conventional venturi geometry (prior art illustrated by FIG. 2), includes a converging nozzle wall that has a linear profile while the current embodiment is sinusoidal. Further, there is no step portion after the throat, with the diverging section immediately following the minimum diameter (throat). The conventional venturi geometry of FIG. 2 also does not include a straight section between the converging section and diverging sections.

Figure 3:
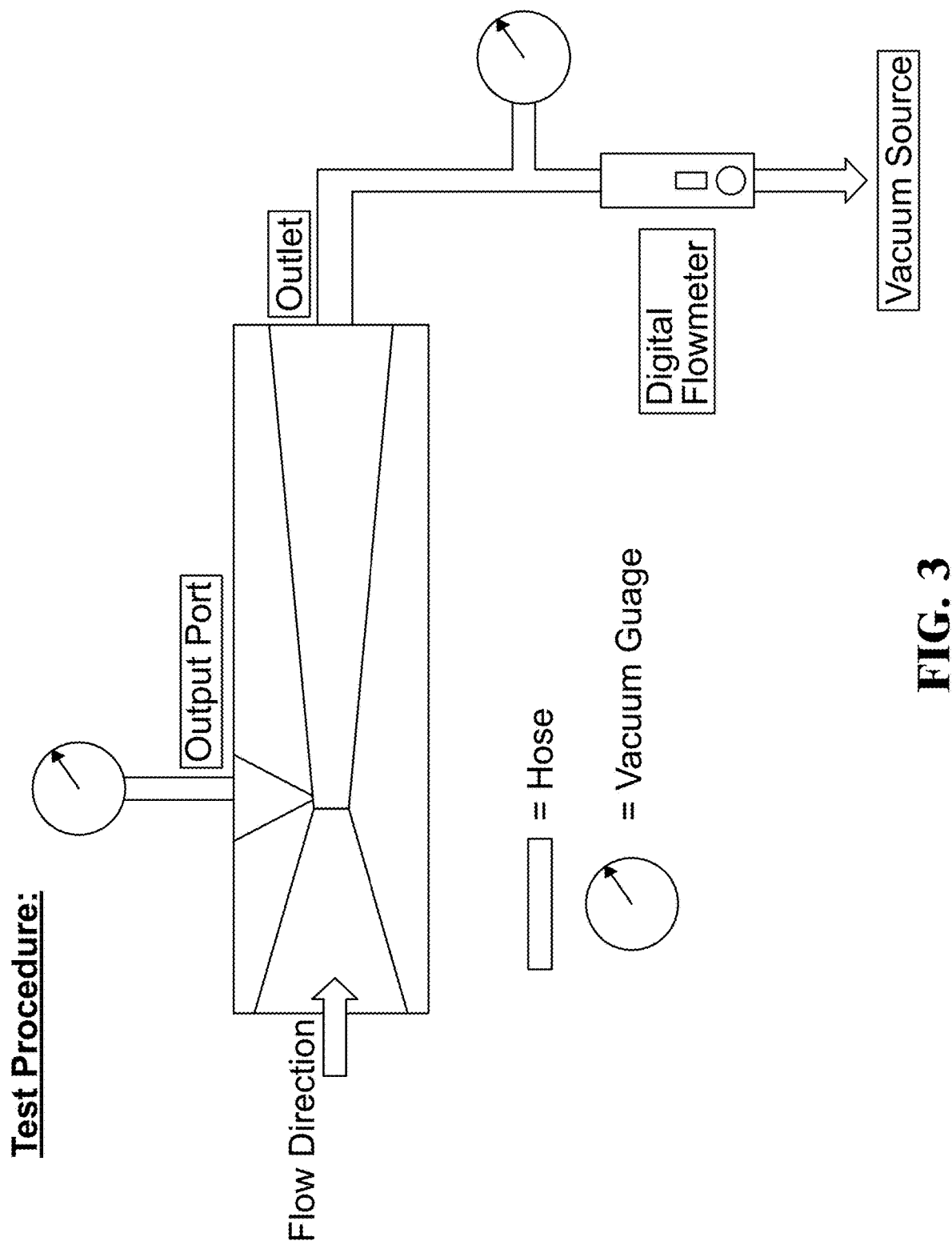
FIG. 3 is a schematic view of a test procedure for analyzing the vacuum generator of FIG. 1 in accordance with the present disclosure.

The described aspirator assembly has been compared to the conventional venturi geometries as illustrated by FIG. 2. The test process is schematically illustrated by FIG. 3 in which a vacuum source is applied to the outlet of both applicant's ("dlhBOWLES Sample") aspirator assembly as well as the conventional venturi assembly (FIG. 2—"Competitor Sample") and the input vacuum is measured using a vacuum gauge. Following this vacuum gauge is a digital flowmeter for measuring gas flow rate in units of standard liter per minute ("slpm"). The digital flowmeter is connected to a vacuum source and controlled by the experimenter. Another vacuum gauge is also connected to the output port. The test was conducted and data collected, including flow rate (slpm) measured through the venturi pipes and output vacuum (inHg) at input vacuum levels ranging from 1 inHg to 18 inHg were recorded. The ratio of output vacuum to input vacuum is the amplification/boost or gain ratio. This test was used to benchmark and compare data for the vacuum amplifier system 100 and method of the present invention and that of the prior art (or the pre-existing geometry of FIG. 2).

Figure 4:
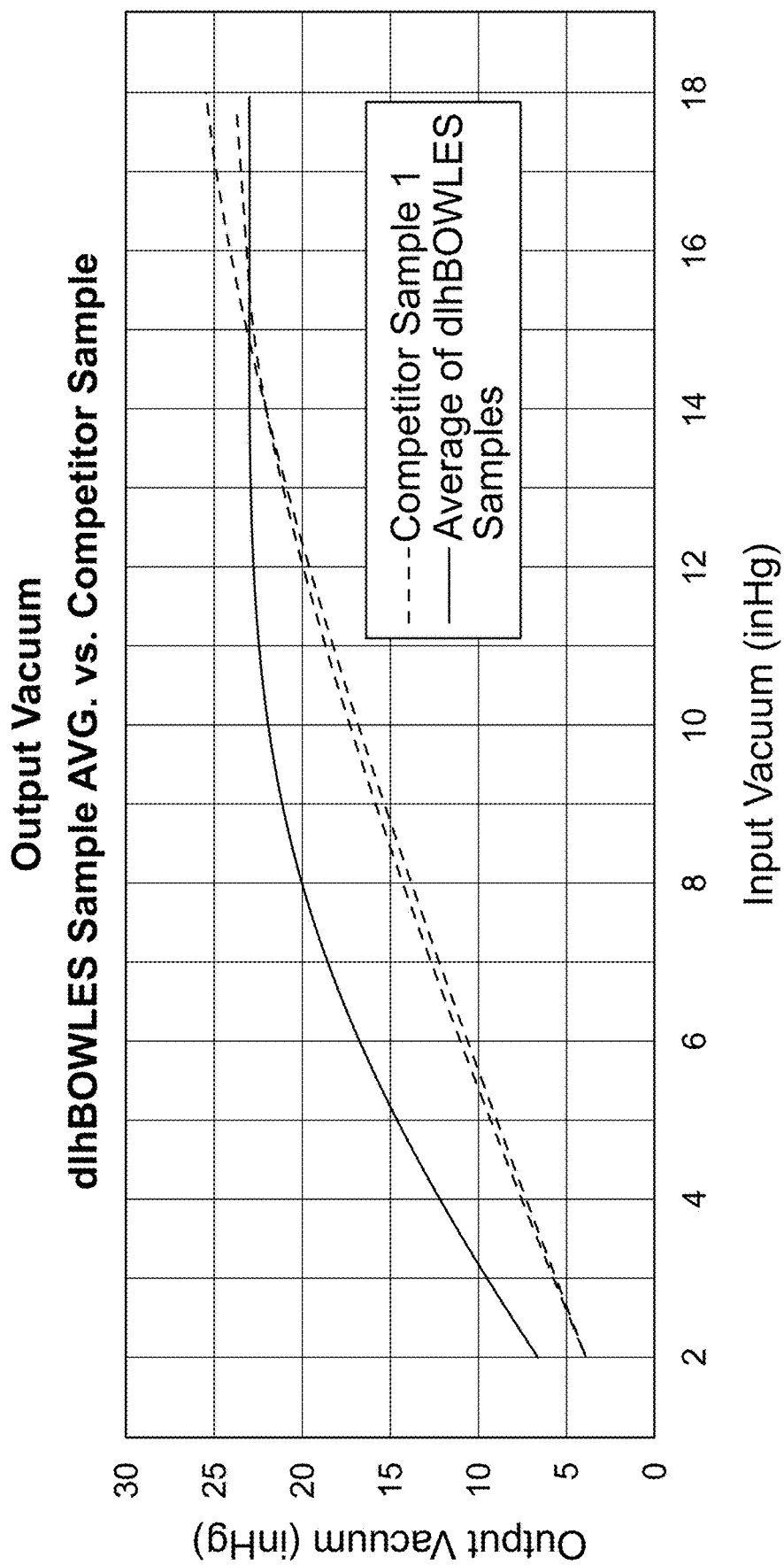
FIG. 4 is an output vacuum graph illustrating comparative results of the vacuum generator assembly of FIG. 1 versus a conventional venturi geometry.
Figure 5:
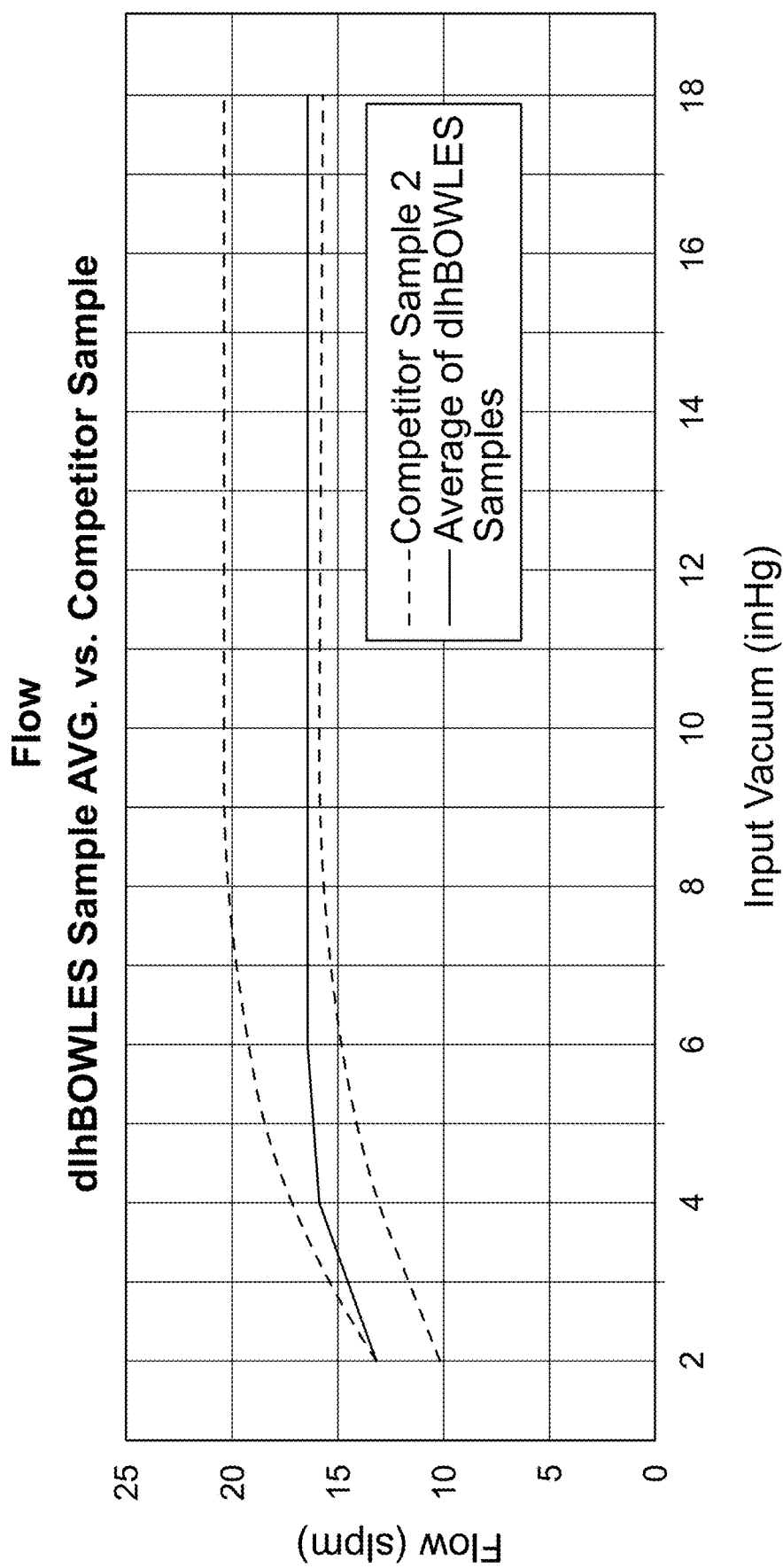
FIG. 5 is an inlet flow rate graph illustrating comparative results of the vacuum generator assembly of FIG. 1 versus a conventional venturi geometry.
Figure 6:
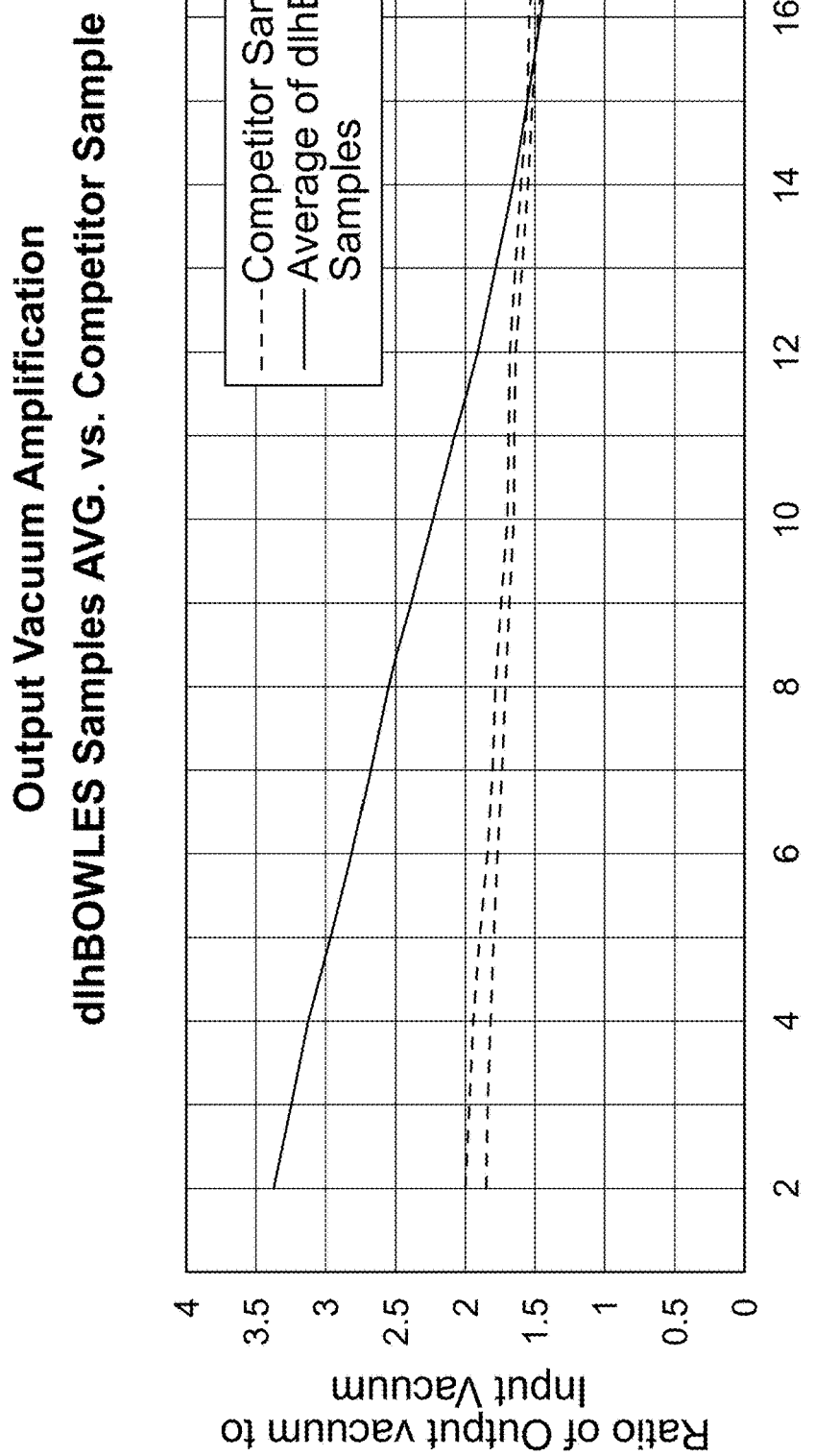
FIG. 6 is an output vacuum amplification graph illustrating comparative results of the vacuum generator assembly of FIG. 1 versus a conventional venturi geometry.

The benefits of the aspirator assembly 100 compared to conventional embodiments can be readily seen from the plotted experimental results illustrated in FIGS. 4 and 5. The benefits of the multi-lumen defining amplifier member 120 can be seen at low vacuum levels (<10 inHg) where the amplifier member 120 outperforms the prior art conventional geometry (e.g., 40%-90% higher than the conventional). FIG. 6 shows vacuum amplification (ratio of output vacuum to input vacuum) as a function of input vacuum. At low vacuum levels the amplifier member 120 amplifies up to 3.5 times the input vacuum, whereas competitor samples peak at about 2 times the input vacuum (FIG. 6). As the input vacuum exceeds 15 inHg, the amplifier member 120 and the conventional geometry perform more closely with one another.

Figure 7:
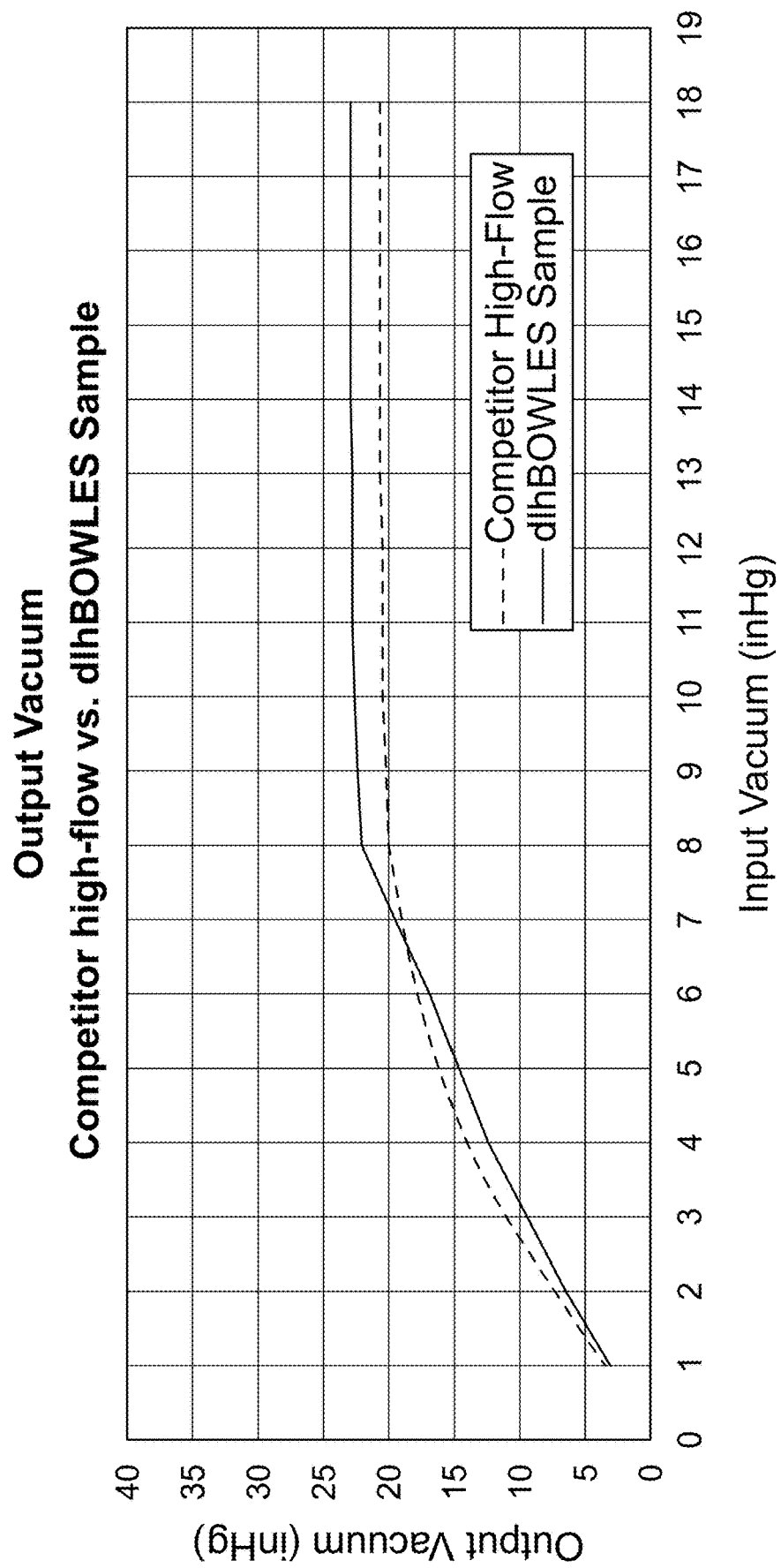
FIG. 7 is an output vacuum graph illustrating comparative results of the vacuum generator assembly of FIG. 1 versus a conventional venturi geometry.
Figure 8:
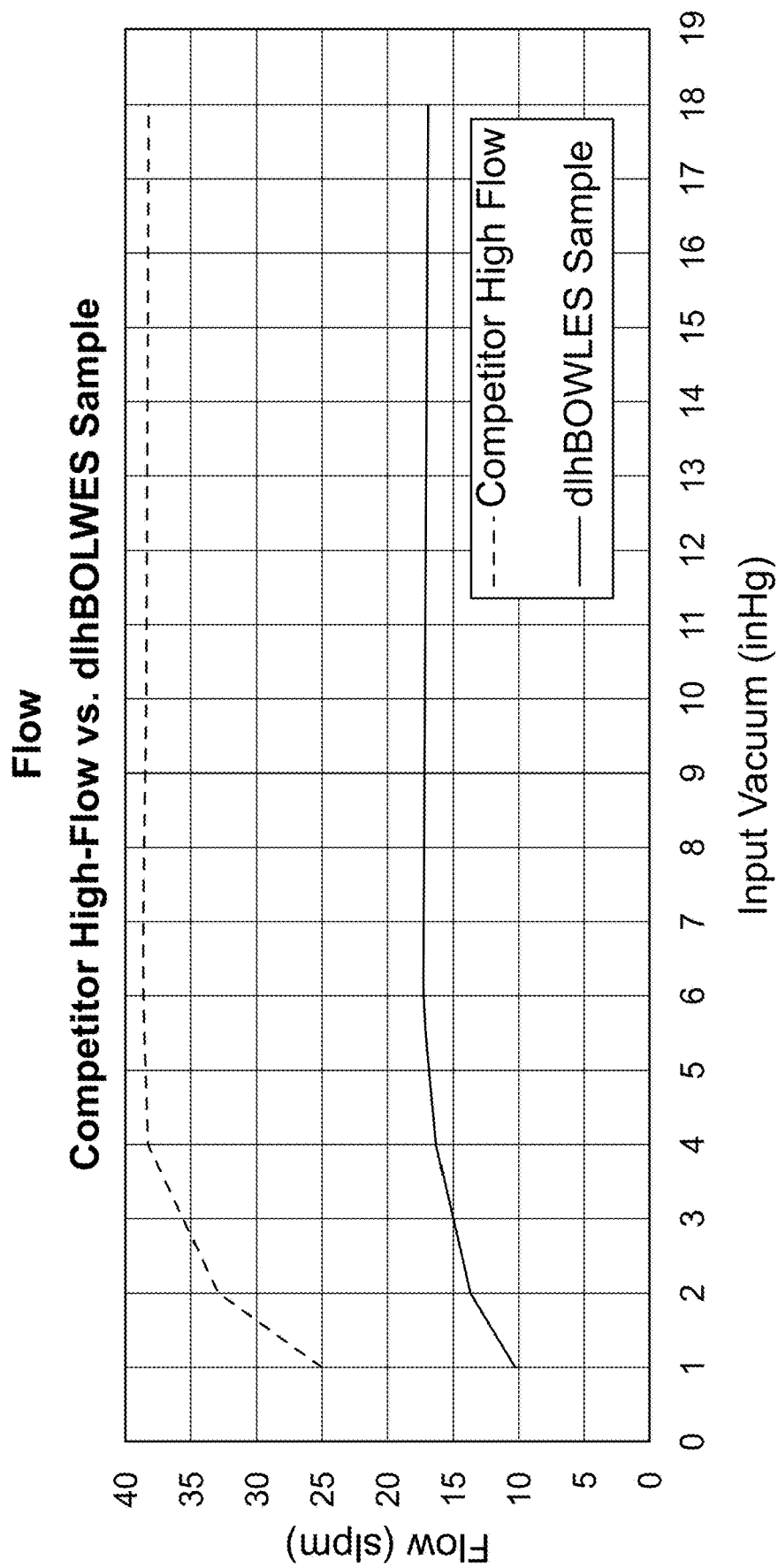
FIG. 8 is an inlet flow rate graph illustrating comparative results of the vacuum generator assembly of FIG. 1 versus a conventional venturi geometry.

FIGS. 7 and 8 show an example of a high flow competitor sample vs. the amplifier member 120, comparing output vacuum (FIG. 7) and inlet flow rate (FIG. 8). In this example, the competitor's sample has a larger throat that results in a higher inlet flow rate. From FIG. 8, it is evident that the competitor's sample requires manifold sourced flows almost 2.5 times higher than the amplifier member 120 to achieve similar output vacuum values (see, e.g., FIG. 7). Conversely, from FIGS. 4, 5 and 6, at similar flow rates, amplifier member 120 out performs the competitor sample by as much as 90%.

Figure 9:
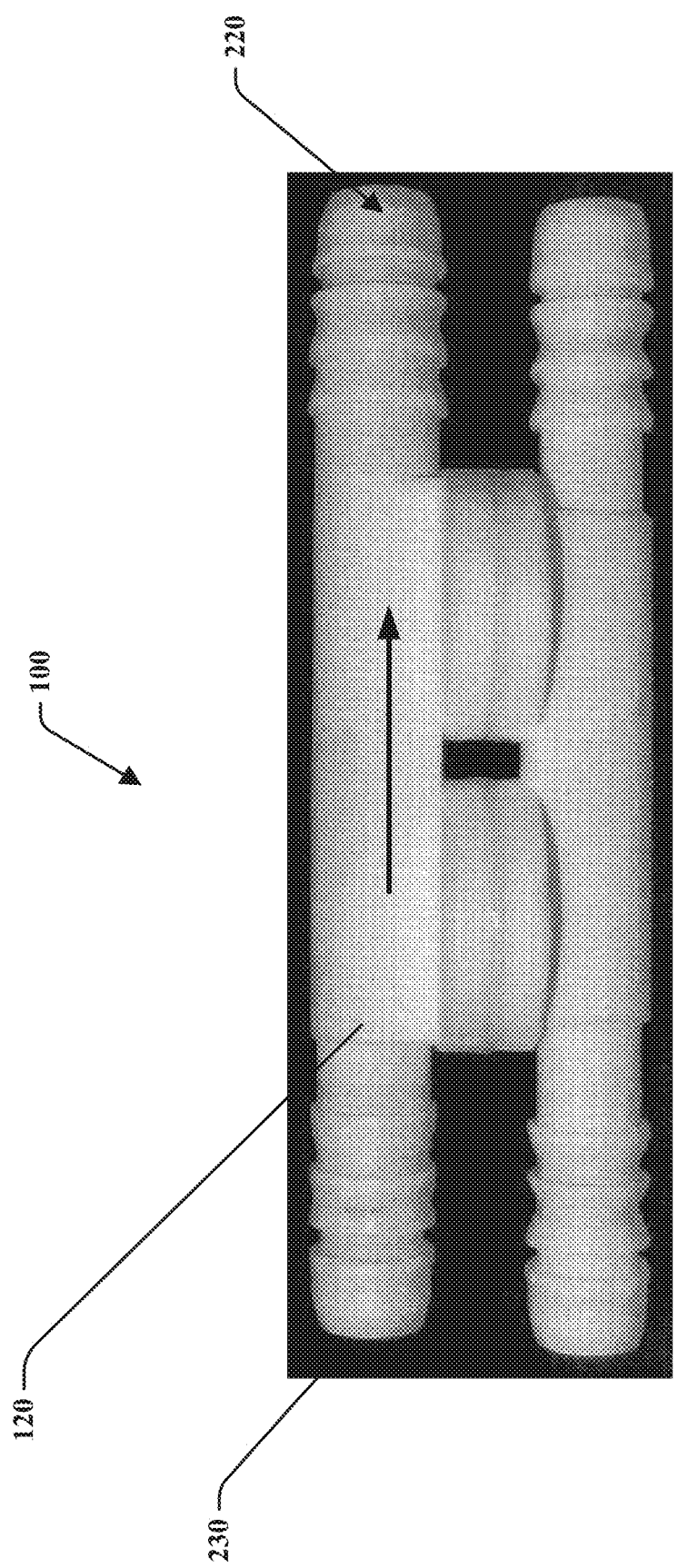
FIG. 9 is a side view of an embodiment of the vacuum generator assembly of the present disclosure.
Figure 10:
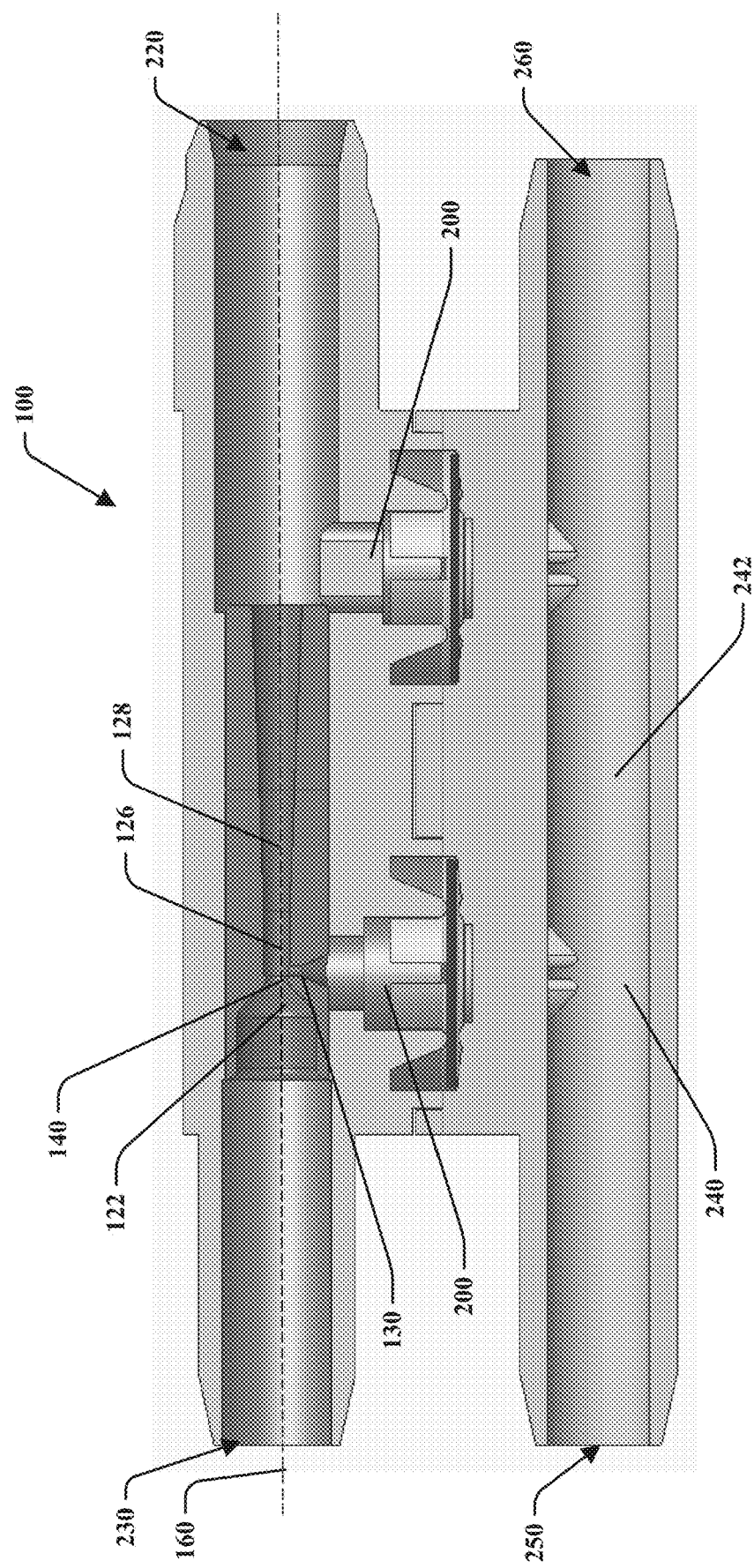
FIG. 10 is a cross sectional view of the vacuum generator assembly of FIG. 8.
Figure 11:
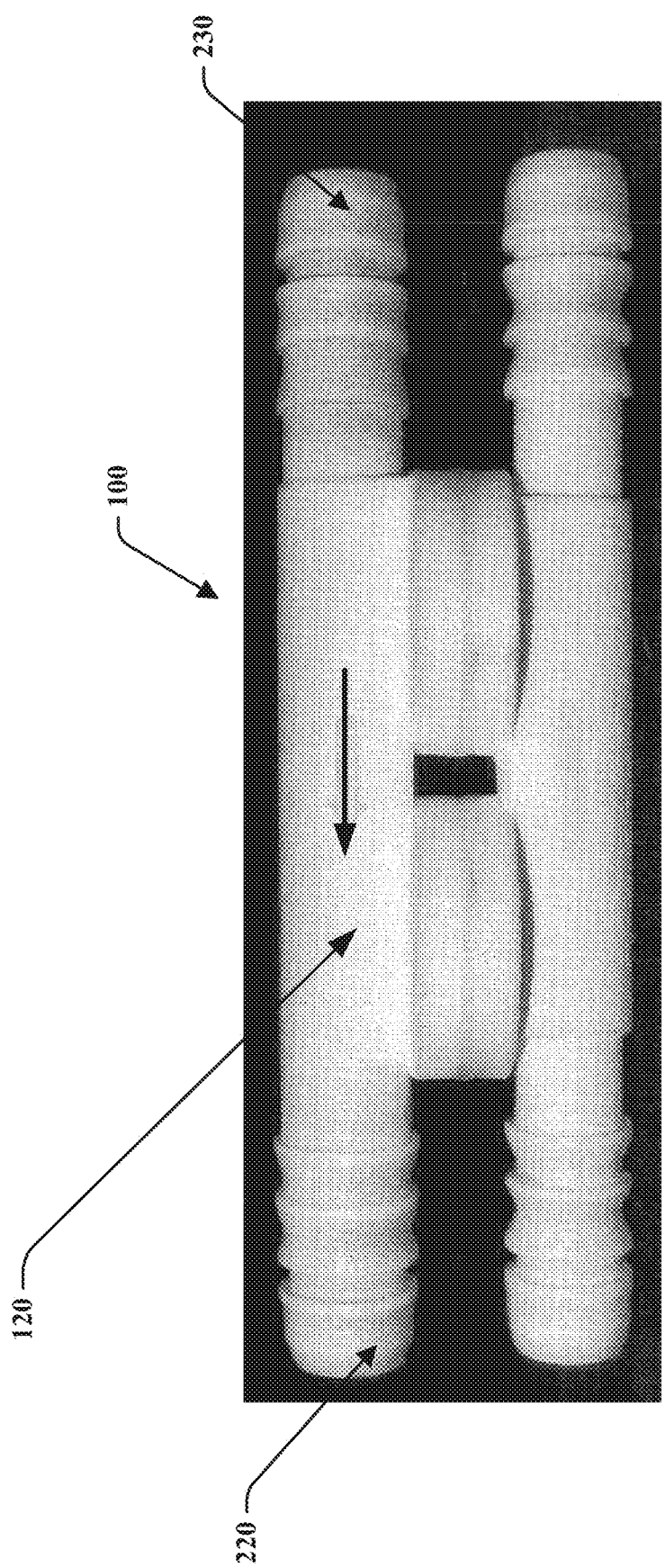
FIG. 11 is a side view of the vacuum generator assembly of the instant application.

FIGS. 9, 10 and 11 illustrates an embodiment of the aspirator system 100 incorporating the multi-lumen defining amplifier member 120 in a multi-port system housing which is configured for connection through tube sections to a vacuum reservoir. FIGS. 9 and 11 show two opposite sides of the aspirator assembly or multi-port brake booster system housing which includes amplifier member 120, as illustrated in the drawing of FIG. 10. The direction of fluid flow is depicted by the arrow in FIGS. 9 and 11. In the embodiment illustrated in FIGS. 9-11, the source of vacuum (not shown) is connected at input port 220, and the opposite side of multi-lumen defining amplifier member 120 (which has a regular or unamplified vacuum is connected to port 230. The amplified vacuum pressure is communicated via the output vacuum port 130 and through a check valve assembly 200 to a tubular member 240 which has an open continuous lumen 242 terminating on opposing ends 250, 260 with barb connectors adapted for tubing for connection to a vacuum reservoir or the like, and so both of those lower ports 250, 260 are for amplified vacuum generated by the system and method of the present invention.

Although the embodiments of the present disclosure have been illustrated in the accompanying drawings and described in the foregoing detailed description, it is to be understood that the present disclosure is not to be limited to just the embodiments disclosed, but that the present disclosure described herein is capable of numerous rearrangements, modifications and substitutions without departing from the scope of the claims hereafter. The claims as follows are intended to include all modifications and alterations insofar as they come within the scope of the claims or the equivalent thereof.

Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. An aspirator assembly comprising:
   a multi-lumen defining amplifier member defining a fluid passage comprising:
      a converging section leading to a throat, said converging section has a sinusoidal cross sectional shape leading to said throat;
      a step portion located adjacent said throat;
      a straight section located adjacent to said step portion;
      a diverging section located adjacent to said straight section; and
      an output vacuum port extending from a sidewall of said multi-lumen defining amplifier member for providing output vacuum, said output vacuum port being located after the throat and at the beginning of the straight section.

2. The aspirator assembly of claim 1, wherein said throat includes a minimum internal lumen diameter D.

3. The aspirator assembly of claim 2, wherein said step is introduced immediately after the throat.

4. The aspirator assembly of claim 3, wherein said step includes an internal lumen diameter in the range of 1.1 D to 1.5 D.

5. The aspirator assembly of claim 2, wherein said fluid passage is aligned along a central flow axis.

6. The aspirator assembly of claim 5, wherein said sinusoidal cross sectional shape of said converging section extends a length in the range of 1 D to 4 D along said central flow axis.

7. The aspirator assembly of claim 5, wherein said straight section extends a length in the range of 3 D to 8 D along said central flow axis.

8. The aspirator assembly of claim 2, wherein said diverging section extends a length in the range of 12 D to 15 D along said central flow axis.

9. The aspirator assembly of claim 2, wherein said sinusoidal shape is particularly effective in converting pressure energy to kinetic energy and minimizing friction losses by using a short converging length of 1 D-4 D.

10. The aspirator assembly of claim 2, wherein said step defines a transversely projecting annular wall segment having a radial extent or diameter of 1.1 D to 1.5 D, in order to generate higher amplification or gain ratios, arid wherein the throat, which terminates distally in the step, defines the beginning of the straight section.

11. The aspirator assembly of claim 1, wherein said straight section defines an inner wall shaped in the form of a cylinder.

12. The aspirator assembly of claim 1, wherein said diverging section defines an inner wall shaped with a tapered angle relative to said straight section wherein said tapered angle is in the range of 3° to 8°.

13. The aspirator assembly of claim 1, wherein said output vacuum port extends generally normal from the longitudinal axis and includes a bore section and a tapered section wherein the bore section directly communicates with the straight section.

14. An aspirator system comprising:
    a multi-lumen defining amplifier member in communication with a multi-port housing configured for connection through tube sections to a vacuum reservoir;
    said a multi-lumen defining amplifier member defining a fluid passage comprising:
       a converging section leading to a throat, said converging section has a sinusoidal cross-sectional shape leading into said throat;
       a step portion located adjacent said throat;
       a straight section located adjacent to said step portion;
       a diverging section located adjacent to said straight section; and
       an output vacuum port extending from a sidewall of said multi-lumen defining amplifier member for providing amplified output vacuum, said output vacuum port being located after the throat;

wherein amplified vacuum pressure is communicated via the output vacuum port to at least one check valve assembly to a tubular member of the multi-port housing.

15. The aspirator system of claim 14, wherein said tubular member includes an open continuous lumen terminating at opposing ends.

16. The aspirator system of claim 15, wherein said opposing ends include barb connectors adapted for connection to a vacuum tube.

17. The aspirator system of claim 14, wherein said straight section includes a proximal end adjacent the throat and a distal end adjacent the divergent section, wherein said output vacuum port is positioned adjacent the proximal end of said straight section.

18. An aspirator assembly comprising:
   a multi-lumen defining amplifier member defining a fluid passage along a central flow axis comprising:
      a converging section leading to a throat, said throat includes a minimum internal lumen dimension D;
      a step portion located adjacent said throat, wherein said step defines a transversely projecting annular wall segment;
      a straight section located adjacent to said step portion wherein the throat, which terminates distally in the step portion, defines the beginning of the straight section, said straight section includes a proximal end adjacent the throat and an opposite distal end;
      a diverging section located adjacent to said distal end of said straight section; and
      an output vacuum port extending from a sidewall of said multi-lumen defining amplifier member for providing output vacuum, said output vacuum port being located after the throat.

19. The aspirator assembly of claim 18, wherein said output vacuum port is positioned adjacent the proximal end of said straight section.

20. The aspirator assembly of claim 18, wherein said converging section includes a sinusoidal cross sectional shape wherein said sinusoidal cross-sectional shape of said converging section extends a length in the range of 1 D to 4 D along said central flow axis
   wherein said step portion includes a radial diameter of 1.1 D to 1.5 D, in order to generate higher amplification or gain ratios.

* * * * *